US012753852B2

(12) United States Patent
Kuo

(10) Patent No.: US 12,753,852 B2
(45) **Date of Patent: *Oct. 6, 2026**

(54) SCHRADER VALVE ADAPTER AND OPTIMIZER

(71) Applicant: Fieldpiece Instruments, Inc., Orange, CA (US)

(72) Inventor: Henry J. Kuo, Orange, CA (US)

(73) Assignee: Fieldpiece Instruments, Inc., Orange, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/070,339

(22) Filed: Mar. 4, 2025

(65) Prior Publication Data

US 2025/0198529 A1 Jun. 19, 2025

Related U.S. Application Data

(63) Continuation of application No. 18/214,749, filed on Jun. 27, 2023, now Pat. No. 12,247,673.

(51) Int. Cl.
*F16K 27/02* (2006.01)
*F16K 1/04* (2006.01)
*F25B 45/00* (2006.01)

(52) U.S. Cl.
CPC ............ *F16K 27/0209* (2013.01); *F16K 1/04* (2013.01); *F25B 45/00* (2013.01); *F16K 2200/501* (2021.08); *Y10T 137/3724* (2015.04)

(58) Field of Classification Search
CPC ........... Y10T 137/3724; F16K 27/0209; F16K 2200/501; F16K 1/04; F25B 45/00
USPC .................. 251/339, 341, 347, 354; 137/231
See application file for complete search history.

(56) References Cited

U.S. PATENT DOCUMENTS

| | | | | | |
|---|---|---|---|---|---|
| 1,300,611 | A | * | 4/1919 | Henemier | F16K 31/58 152/429 |
| 1,311,898 | A | * | 8/1919 | Jackson | F16K 15/20 137/226 |
| 1,724,063 | A | * | 8/1929 | Anderson | B60C 29/068 137/225 |
| 2,178,828 | A | * | 11/1939 | Broecker | B60C 29/066 137/630.22 |
| 2,508,503 | A | * | 5/1950 | Doepke | B60C 29/00 137/880 |
| 2,812,000 | A | * | 11/1957 | Trinca | B60C 29/06 251/293 |
| 3,037,544 | A | * | 6/1962 | Gouirand | B60C 23/007 137/225 |
| 3,315,695 | A | * | 4/1967 | Boyer | B60C 29/00 137/232 |
| 3,811,006 | A | * | 5/1974 | Burnell | H02G 15/26 137/232 |
| 4,445,527 | A | * | 5/1984 | Leimbach | B60C 23/0496 137/232 |
| 4,660,590 | A | * | 4/1987 | Sanchez | B60C 23/0496 251/360 |
| 4,706,357 | A | * | 11/1987 | Ewing | B25B 27/24 29/213.1 |

(Continued)

*Primary Examiner* — William M Mccalister
(74) *Attorney, Agent, or Firm* — Paul J. Backofen, Esq.

(57) ABSTRACT

A Schrader valve adapter and optimizer engages an HVAC flare fitting and includes an adjustment collar that controls the insertion depth of the core depressor enabling the technician to avoid blow outs and compensate for Schrader valve cores that are set at maximum insertion depth.

11 Claims, 5 Drawing Sheets

(56) References Cited

U.S. PATENT DOCUMENTS

| | | | | | |
|---|---|---|---|---|---|
| 4,995,417 | A * | 2/1991 | Naku | B65D 83/306 | 141/387 |
| 5,778,923 | A * | 7/1998 | Marston | F16K 15/207 | 137/228 |
| 5,816,284 | A * | 10/1998 | Lin | B60C 29/064 | 251/293 |
| 6,220,836 | B1 * | 4/2001 | Wu | F04B 33/005 | 417/467 |
| 6,253,436 | B1 * | 7/2001 | Barjesteh | B25B 27/24 | 29/213.1 |
| 6,651,689 | B1 * | 11/2003 | Stech | F16K 15/20 | 251/293 |
| 6,856,245 | B2 * | 2/2005 | Smith | B60C 23/0496 | 340/447 |
| 7,032,611 | B1 * | 4/2006 | Sheng | G05D 16/103 | 137/557 |
| 8,210,501 | B2 * | 7/2012 | Lee | F16K 15/20 | 251/285 |
| 8,245,722 | B2 * | 8/2012 | Huang | F04B 33/005 | 137/231 |
| 8,899,254 | B1 * | 12/2014 | Weiler | F16L 41/06 | 81/53.2 |
| 10,384,498 | B2 * | 8/2019 | Foor | B60C 23/00363 | |
| 10,478,953 | B2 * | 11/2019 | Green | B25B 27/24 | |
| 11,345,196 | B2 * | 5/2022 | Su | B60C 29/002 | |
| 11,549,612 | B1 * | 1/2023 | Jones | F16K 27/067 | |
| 11,879,565 | B1 * | 1/2024 | Kuo | F16K 43/003 | |
| 12,110,989 | B2 * | 10/2024 | Kuo | F16K 43/003 | |
| 12,247,673 | B2 * | 3/2025 | Kuo | F25B 45/00 | |
| 2009/0095359 | A1 * | 4/2009 | Campau | F16K 15/207 | 137/226 |
| 2012/0125446 | A1 * | 5/2012 | Chuang | B60C 29/06 | 137/231 |
| 2014/0014197 | A1 * | 1/2014 | Renaker | B60C 25/18 | 137/231 |
| 2020/0269400 | A1 * | 8/2020 | Jones | B25B 13/48 | |

* cited by examiner

Fig. 12
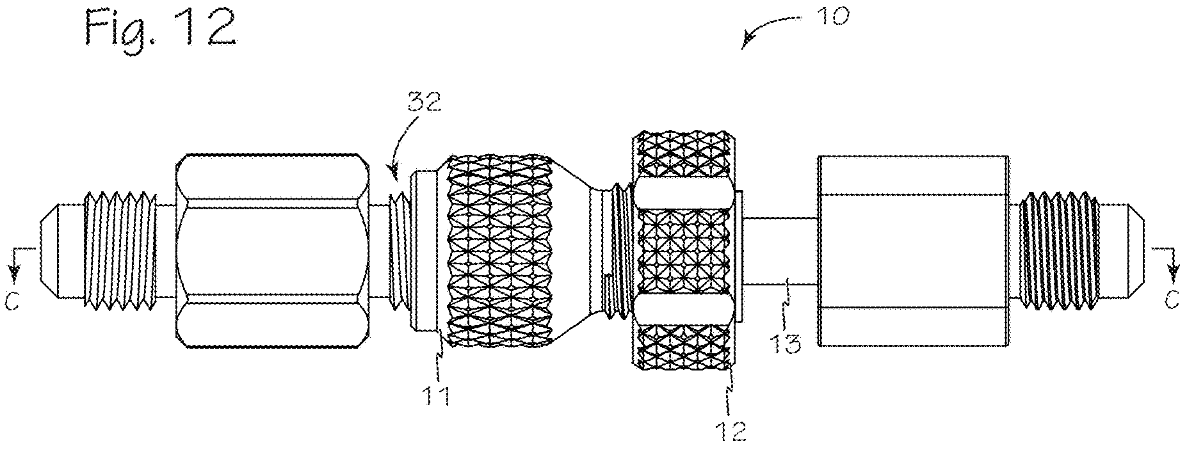
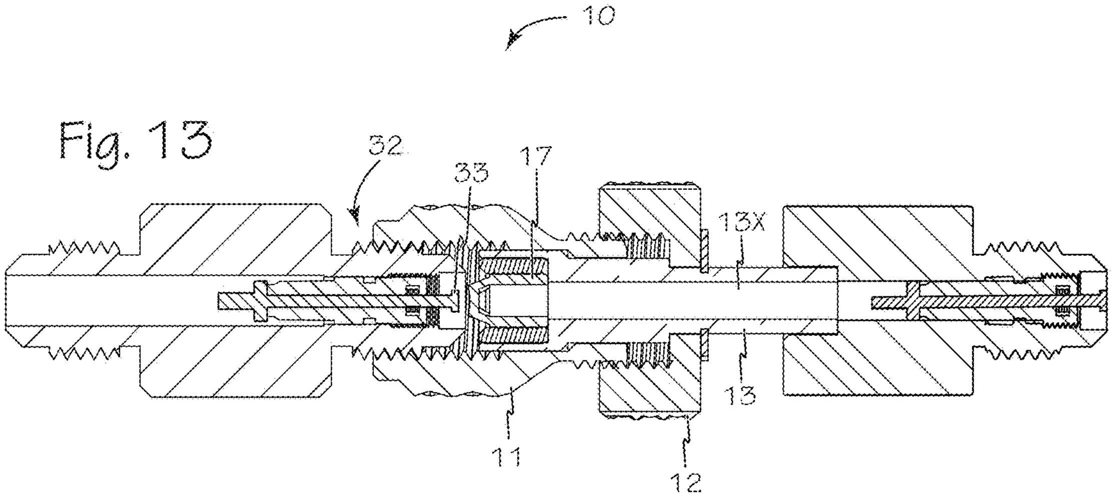
Fig. 13
Fig. 14
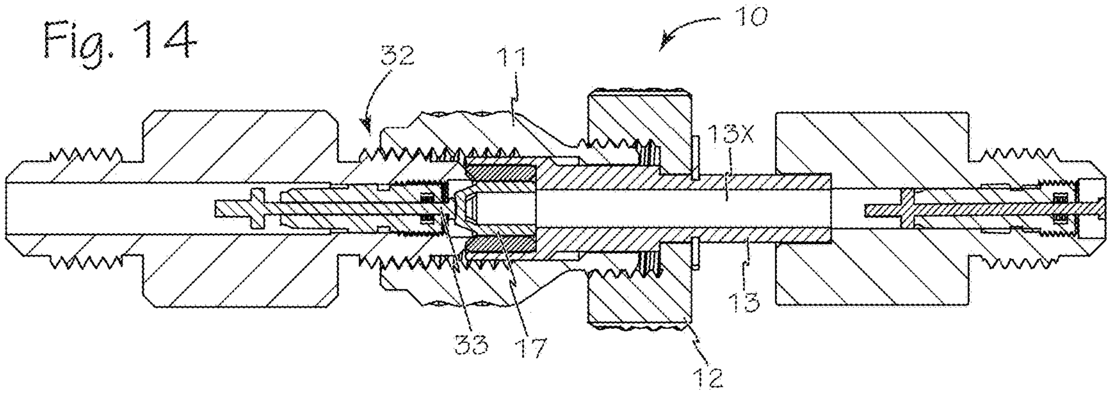

SCHRADER VALVE ADAPTER AND OPTIMIZER

This application is a continuation of U.S. application Ser. No. 18/214,749, filed Jun. 27, 2023.

FIELD OF THE INVENTIONS

The inventions described below relate to the field of heating, ventilation and air conditioning (HVAC) Schrader valves.

BACKGROUND OF THE INVENTIONS

Schrader valves are often used in HVAC system to seal and control access to refrigerant and other fluids. When the Schrader valve core is inserted deep into a male flare fitting, the core depressor of an attached female flare fitting is unable to fully open the Schrader valve and sometimes it may not even engage the pin of the Schrader valve core. A similar situation arises when the male flare fitting passes through a surface and one or more nuts are used to secure the flare fitting to the surface. The female flare fitting and core depressor that engages the Schrader valve core is again unable to fully open the valve because the female flare fitting contacts the nuts securing the flare fitting before the core depressor engages, or fully engages, the pin of the Schrader valve core. In these situations an HVAC technician wastes precious time adding or removing refrigerant from a system.

Alternatively, if the Schrader valve core is minimally inserted into the male flare fitting with the valve core pin extending slightly from the male flare fitting, a technician may encounter a blow out caused by a release of pressurized refrigerant between the male and female flare fittings when the core depressor pushing the Schrader valve core before the male and female flare fittings are fully mated.

SUMMARY

The Schrader valve adapter and optimizer engages the HVAC flare fitting and includes an adjustment collar that controls the insertion depth of the core depressor enabling the technician to avoid blow outs and compensate for Schrader valve cores that are set at maximum insertion depth.

A Schrader valve adapter and optimizer comprises a female flare adapter having a female input and a male output, an adjustment collar having a threaded female socket at a first end and an internal shoulder adjacent a second end, the threaded female socket engaging the male output of the female flare adapter, an internal conduit having an internal bore, a first end, a second end, an external ridge between the first and second end and an external slot between the second end and the external ridge, the internal conduit extending through the female flare adapter and the adjustment collar, the first end having a core depressor socket within the female flare adapter and the second end and external slot extending beyond the second end of the adjustment collar second end, a hose adapter having a first end and a second end, the first end having a male flare fitting with an internal Schrader valve, the second end sealingly engaged to the second end of the internal conduit creating a fluid conduit from the male flare fitting at the first end of the hose adapter to the core depressor socket within the female flare adapter, and a snap ring engaging the external slot of the adapter conduit to maintain the internal shoulder of the adjustment collar in contact with the external ridge of the internal conduit.

A method of opening a Schrader valve in an HVAC flare fitting comprises the steps of providing a Schrader valve adapter and optimizer with a female flare adapter, a core depressor and an adjustment collar, then holding the female flare adapter and rotating the adjustment collar counter-clockwise until it stops and then securing the female flare adapter to the HVAC flare fitting to create a seal between the female flare adapter and the HVAC flare fitting, and then rotating the adjustment collar clockwise until the core depressor fully depresses the Schrader valve in the HVAC flare fitting.

BRIEF DESCRIPTION OF THE DRAWINGS

FIG. 12 is a side view of the Schrader valve adapter and optimizer of 10 engaged to the HVAC flare fitting.

FIG. 13 is a cross-section view of the Schrader valve adapter and optimizer engaged to the HVAC flare fitting of FIG. 12 taken along C-C with the female flare adapter fully extended.

FIG. 14 is a cross-section view of the Schrader valve adapter and optimizer engaged to the HVAC flare fitting of FIG. 12 taken along C-C with the female flare adapter partially extended.

DETAILED DESCRIPTION OF THE INVENTIONS

Figure 1:
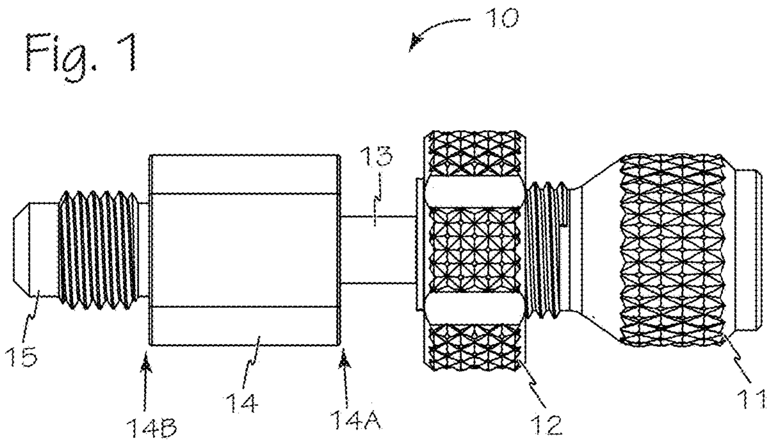
FIG. 1 is a side view of a Schrader valve adapter and optimizer.
Figure 2:
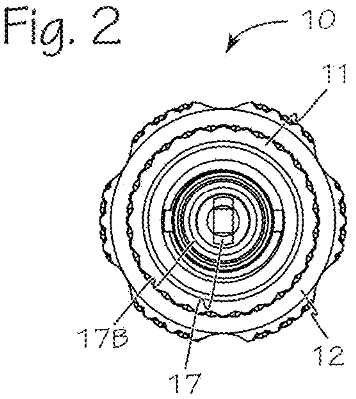
FIG. 2 is a first end view of the Schrader valve adapter and optimizer of FIG. 1 looking into the female flare adapter.
Figure 3:
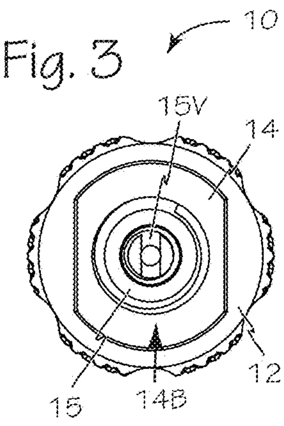
FIG. 3 is a second end view of the Schrader valve adapter and optimizer of FIG. 1 looking into the hose adapter.

FIGS. 1 through 9 illustrate various perspectives and views of Schrader valve adapter and optimizer 10. Schrader valve and optimizer 10 has a female flare adapter 11 engaging adjustment collar 12, an internal conduit 13 has a first end 13A with a core depressor socket 8 and a second end 13B and extends through the female flare adapter 11 and adjustment collar 12 and second end 13B is connected to hose adapter 14. Hose adapter 14 has a first end 14A with socket 14S to engage internal conduit 13 and a second end 14B that includes any suitable connector such as male flare fitting 15 sealed with any suitable component such as with an internal Schrader valve 15V.

Figure 8:
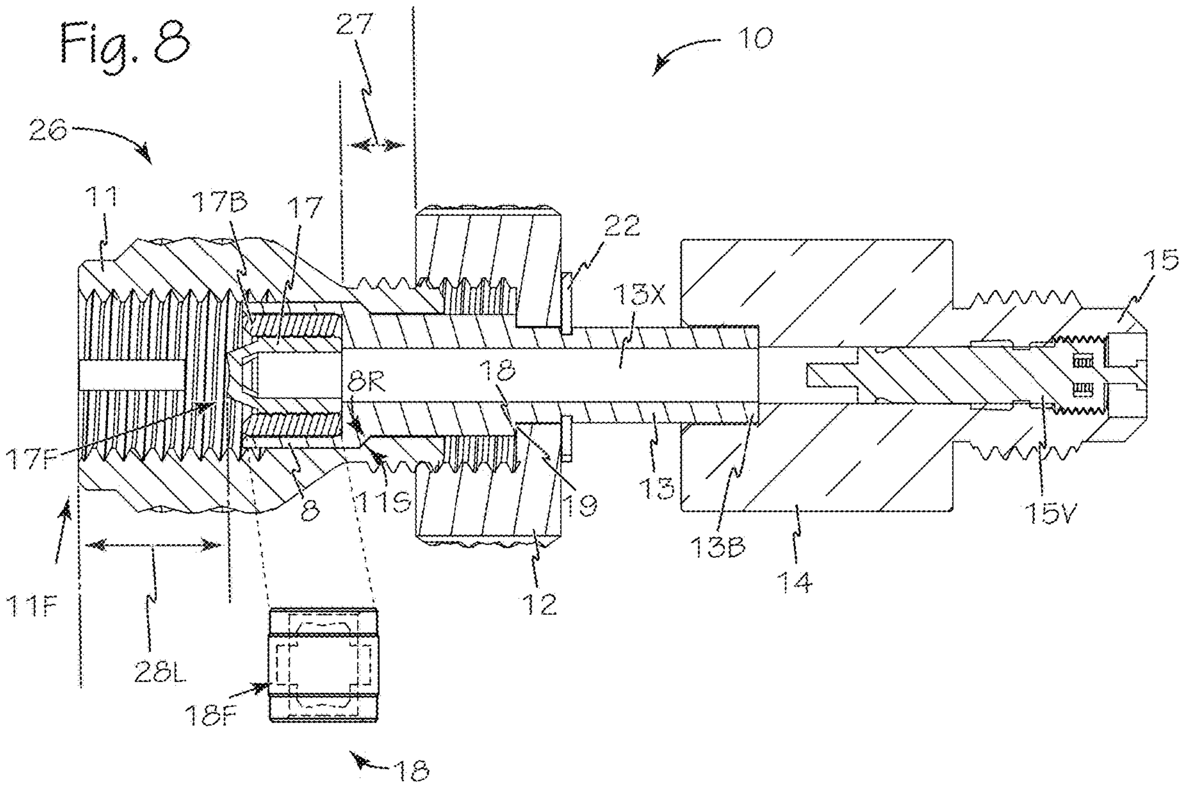
FIG. 8 is a cross section view of the Schrader valve adapter and optimizer of FIG. 4 taken along A-A with the female flare adapter fully extended.
Figure 9:
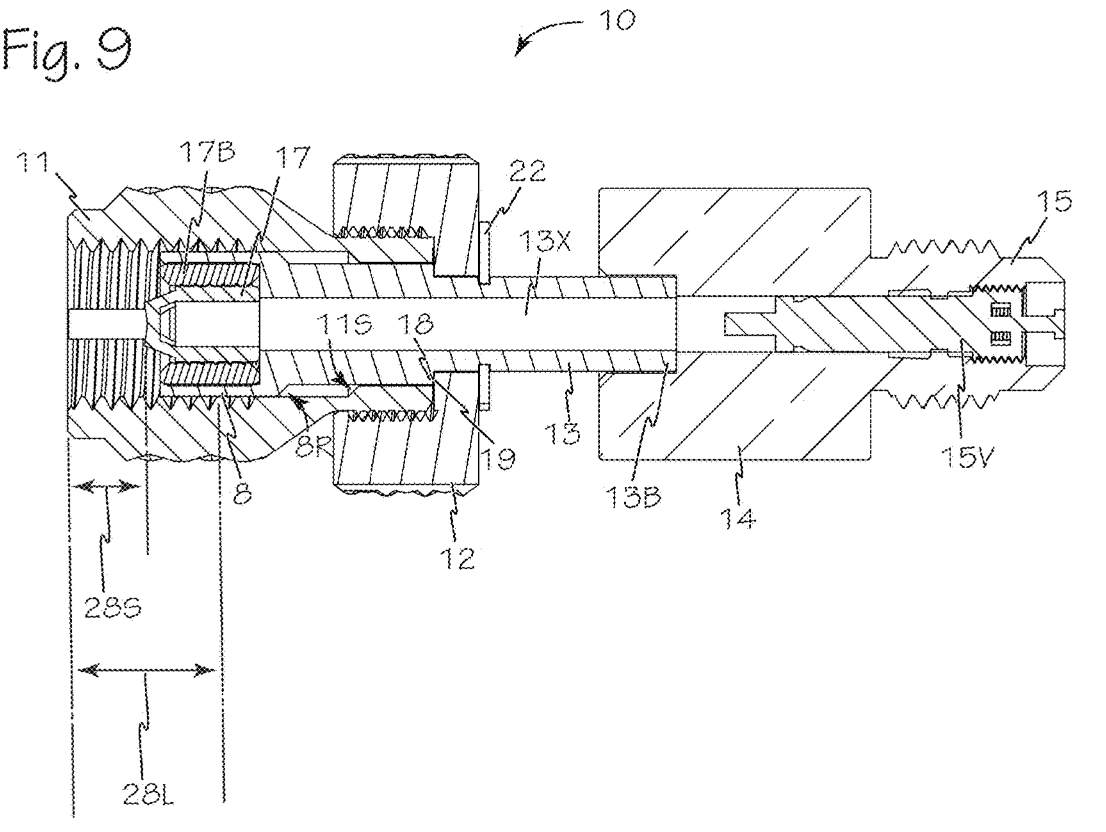
FIG. 9 is a cross section view of the Schrader valve adapter and optimizer of FIG. 4 taken along A-A with the female flare adapter fully withdrawn.
Figure 10:
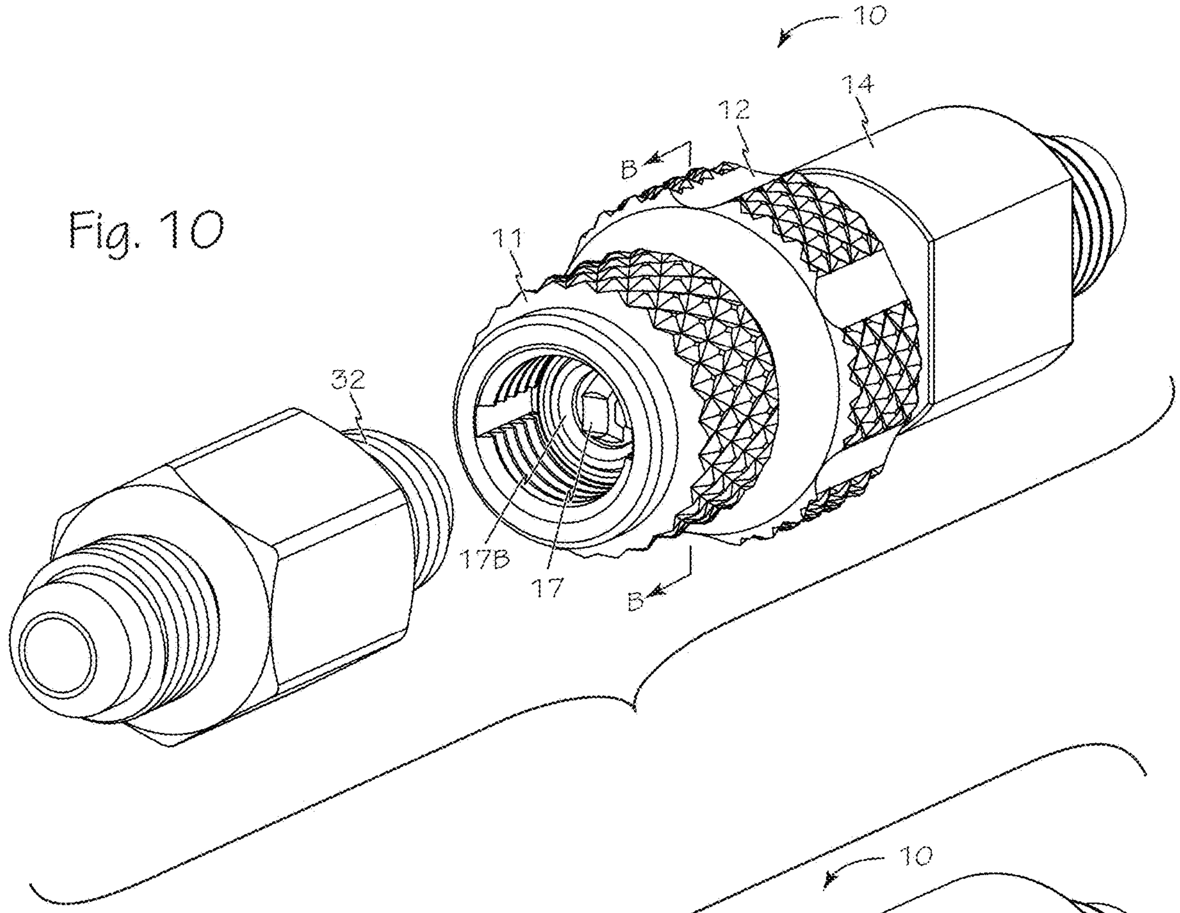
FIG. 10 is a right front perspective view of the Schrader valve adapter and optimizer of FIG. 1 with an HVAC flare fitting ready to engage.
Figure 11:
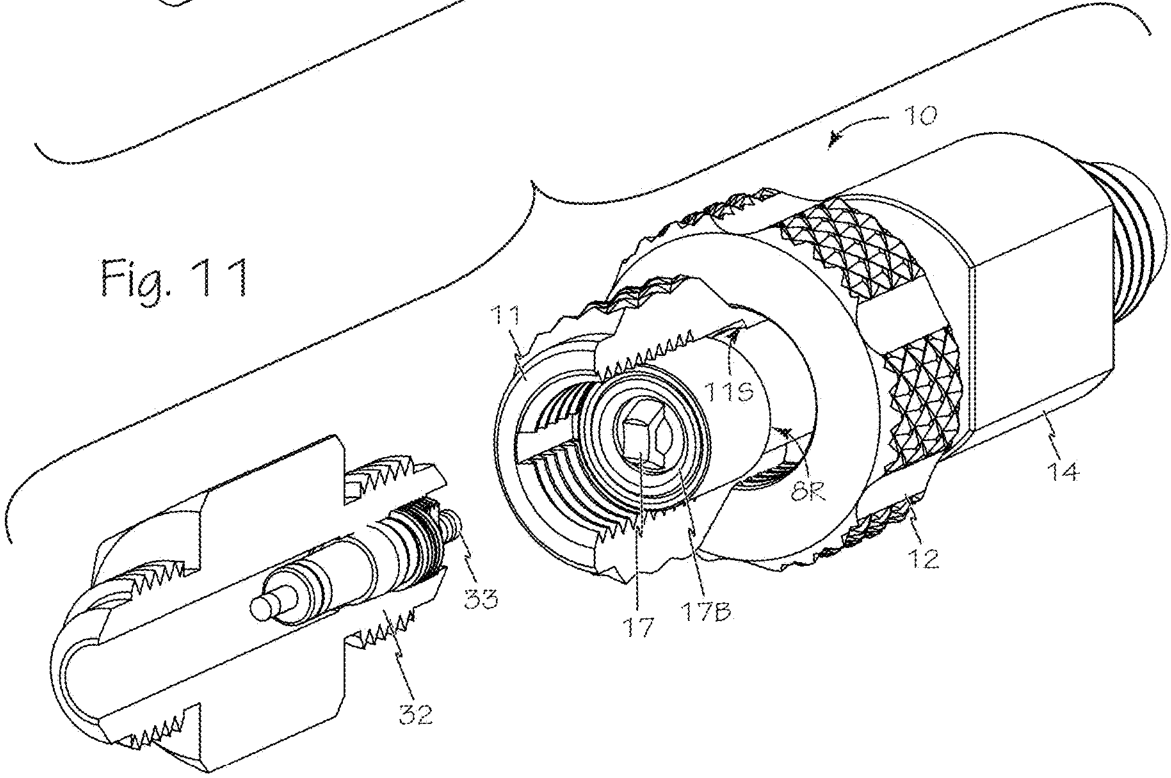
FIG. 11 is a partial cross section of the Schrader valve adapter and optimizer and HVAC flare fitting of FIG. 10 taken along B-B.

Internal conduit 13 has an internal bore 13X that forms a fluid conduit from the female flare adapter 11 to the hose adapter 14 as illustrated in FIGS. 8, 9, 13 and 14. First end 13A of the internal conduit 13 has a core depressor socket 8 to support and frictionally engage any suitable core depressor and core depressor gasket such as core depressor 17 and core depressor gasket 17B or insert molded core depressor 18 as described in co-pending U.S. patent application Ser. No. 18/079,771 filed Dec. 12, 2022 and incorporated by reference herein. Use of insert molded core depressor 18 will enable optimum evacuation or filling of an HVAC system by virtue of its optimized flow coupled with the ability to optimize the opening of the Schrader valve. Second end 13B engages and seals with hose adapter 14 using any suitable technique such as threads, welding or brazing. Between the first end 13A and second end 13B, internal conduit 13 has an ridge 19 sized to engage shoulder 20 in adjustment collar 12 as illustrated in FIGS. 8 and 9. Between ridge 19 and second end 13B internal conduit 13 has a slot 21 to engage a snap ring such as snap ring 22 to rotatably capture adjustment collar 12 between ridge 19 and snap ring 22.

The necessity of assembling the components requires that internal conduit 13 be formed separately from hose adapter 14 to enable adjustment collar 12 and female flare adapter 11 to be interposed between core depressor socket 8 and the hose adapter. In an alternate configuration, the core depressor socket 8 is a separate component that is brazed, welded or threaded to engage the first end 13A of the internal conduit.

Figure 4:
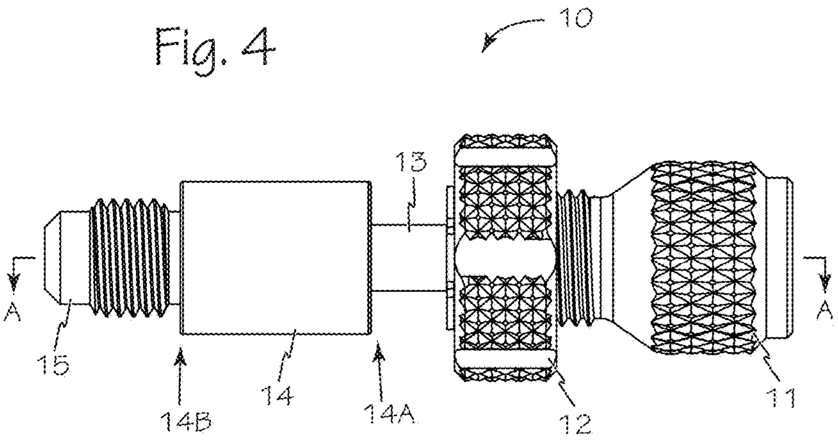
FIG. 4 is a top view of the Schrader valve adapter and optimizer of FIG. 1.
Figure 5:
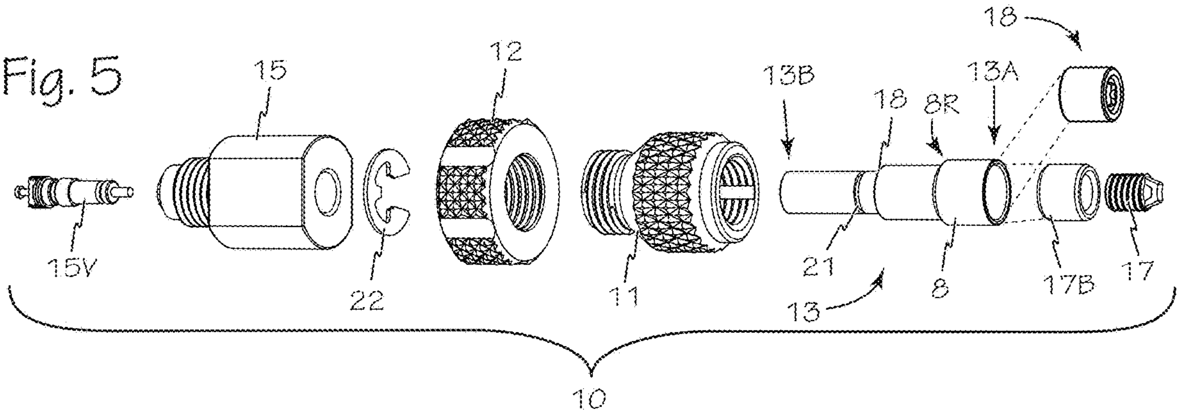
FIG. 5 is an exploded perspective view of the Schrader valve adapter and optimizer of FIG. 1.
Figure 6:
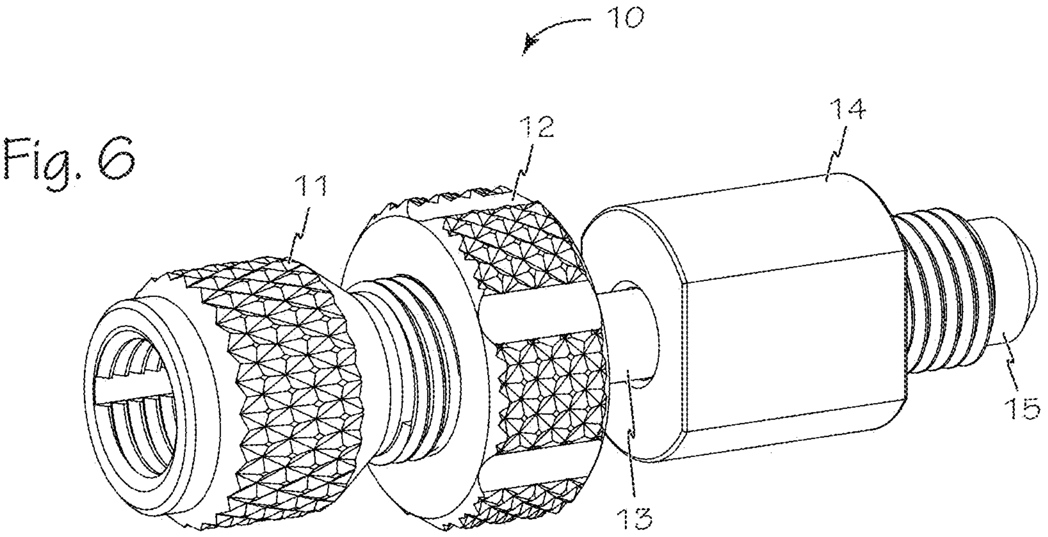
FIG. 6 is a right front perspective view of the Schrader valve adapter and optimizer of FIG. 1.
Figure 7:
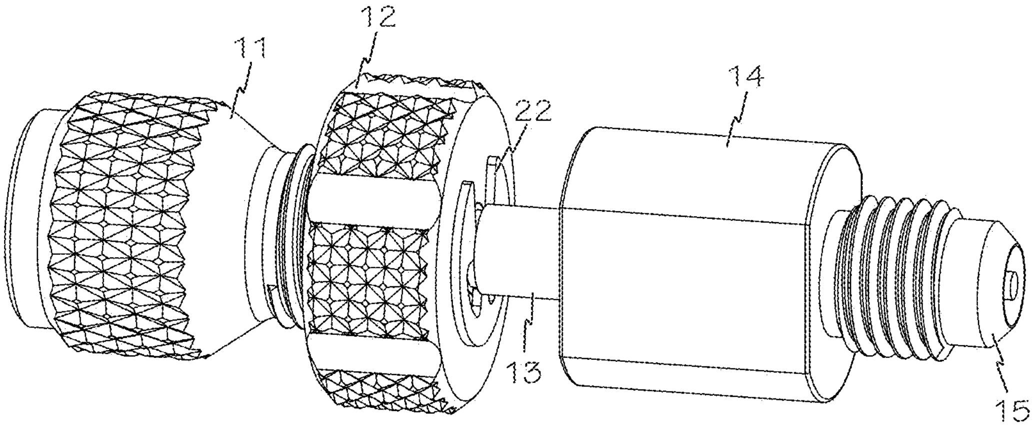
FIG. 7 is a right rear perspective view of the Schrader valve adapter and optimizer of FIG. 1.

FIGS. 8 and 9 specifically illustrate cross-section views of the Schrader valve adapter and optimizer 10 of FIG. 4 taken along A-A showing how the female flare adapter 11 is extended and retracted by rotating the adjustment collar 12. FIG. 8 illustrates female flare adapter 11 fully extended into connection position 26 which maximizes the adapter-collar distance 27 as well as maximizing the core depressor depth to depth 28L which is represented by distance from the face 11F of female flare adapter 11 to contact face 17F of core depressor 17, or contact face 18F of insert molded core depressor 18. This position prevents refrigerant blow out that occurs when the Schrader valve core is depressed before the female flare adapter is able to achieve a seal against the male flare fitting. To achieve connection position 26, a user rotates adjustment collar 12 counterclockwise relative to female flare adapter 11 as seen from the second end position of FIG. 3. Rotating the adjustment collar 12 relative to female flare adapter 11 will increase adapter collar distance 27 and will eventually bring the rear face 8R of core depressor socket 8 into contact with internal shoulder 11S of female flare adapter 11 and no further rotation of the adjustment collar is possible as illustrated in FIG. 8. FIG. 9 illustrates female flare adapter 11 fully retracted into maximum engagement position 30 which minimizes the adapter-collar distance 27 as well as minimizing the core depressor depth to depth 28S. Rotation of adjustment collar 12 clockwise from connection position 26 controls the position of female flare adapter 11 and thus the engagement of whichever core depress is being used to the Schrader valve core pin.

FIGS. 10 through 14 illustrate the connection and use of Schrader valve adapter and optimizer 10. A user locates an HVAC male flare fitting, such as male flare fitting 32, to connect the Schrader valve adapter and optimizer 10 as illustrated. Prior to connection to a male flare fitting, such as flare fitting 32, a user rotates the adjustment collar 12 relative to female flare adapter 11 to achieve connection position 26 which maximizes the adapter-collar distance. The female flare adapter 11 is then rotated to fully engage and seal against male flare fitting 32. The user then rotates adjustment collar 12 relative to the female flare fitting to bring the core depressor, such as core depressor 17, into contact with Schrader valve core pin 33 to fully open the Schrader valve core as illustrated in FIG. 14.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with employed in embodiments alone or in combination with each other. Other embodiments and configurations may be devised without departing from the spirit of the inventions and the scope of the appended claims.

I claim:

1. A Schrader valve adapter and optimizer comprising:

a female flare adapter having a female input and a male output;

an adjustment collar having a threaded female socket at a first end and an internal shoulder adjacent a second end, the threaded female socket engaging the male output of the female flare adapter;

an internal conduit having an internal bore, a first end, a second end, an external ridge between the first and second end and an external slot between the second end and the external ridge, the internal conduit extending through the female flare adapter and the adjustment collar, the first end having a core depressor socket within the female flare adapter and the second end and external slot extending beyond the second end of the adjustment collar second end;

a hose adapter having a first end and a second end, the first end having a male flare fitting with an internal Schrader valve, the second end having a socket sealingly engaged to the second end of the internal conduit creating a sealed conduit from the male flare fitting at the first end of the hose adapter to the core depressor socket within the female flare adapter; and a connector engaging the internal conduit to maintain the internal shoulder of the adjustment collar in contact with the external ridge of the internal conduit.

2. The Schrader valve adapter and optimizer of claim 1 wherein the second end of the internal conduit is brazed into the socket in the second end of the hose adapter.

3. The Schrader valve adapter and optimizer of claim 2 wherein the second end of the internal conduit is threaded into the socket in the second end of the hose adapter.

4. The Schrader valve adapter and optimizer of claim 1 further comprising:

a core depressor gasket seated within the core depressor socket of the internal conduit; and a core depressor secured within the core depressor gasket.

5. The Schrader valve adapter and optimizer of claim 1 further comprising:

an insert molded core depressor seated within the core depressor socket of the internal conduit.

6. A Schrader valve adapter and optimizer comprising:

an internal conduit having a core depressor socket at a first end and a second end sealed to a hose adapter with a male flare fitting sealed with a Schrader valve;

a female flare adapter interposed between the core depressor socket and the hose adapter surrounding the internal conduit; and an adjustment collar removably secured to the female flare adapter and interposed between the female flare adapter and the hose adapter.

7. The Schrader valve adapter and optimizer of claim 6 wherein the internal conduit has an external ridge between the core depressor socket and the second end.

8. The Schrader valve adapter and optimizer of claim 7 wherein the internal conduit has an external slot between the core external ridge and the second end.

9. The Schrader valve adapter and optimizer of claim 8 further comprising:

a connector engaging the internal conduit to maintain the internal shoulder of the adjustment collar in contact with the external ridge of the internal conduit.

10. A method of connecting a hose to an HVAC flare fitting with a Schrader valve comprising the steps:

providing a Schrader valve adapter and optimizer with a female flare adapter, a core depressor, an adjustment collar and a male flare fitting output;

holding the female flare adapter and rotating the adjustment collar counterclockwise until it stops;

securing the female flare adapter to the HVAC flare fitting to create a seal between the female flare adapter and the HVAC flare fitting;

rotating the adjustment collar clockwise until the core depressor fully depresses the Schrader valve in the HVAC flare fitting; and connecting a hose to the male flare fitting output of the Schrader valve adapter and optimizer.

11. The method of connecting a hose to an HVAC flare fitting with a Schrader valve of claim 10 wherein the core depressor is an insert molded core depressor.

* * * * *